(12) United States Patent
Perez et al.

(10) Patent No.: US 9,286,704 B2
(45) Date of Patent: *Mar. 15, 2016

(54) GRAPHICAL USER INTERFACE FOR EFFICIENTLY VISUALIZING MULTIPLE MESSAGES OF DIFFERENT SEVERITIES IN A TABULAR FORMAT

(71) Applicant: International Business Machines Corporation, Armonk, NY (US)

(72) Inventors: Rolando Perez, Poughkeepsie, NY (US); Christopher A. Robbins, Monroe Township, NJ (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 265 days.

This patent is subject to a terminal disclaimer.

(21) Appl. No.: 13/896,680

(22) Filed: May 17, 2013

(65) Prior Publication Data

US 2014/0340407 A1    Nov. 20, 2014

(51) Int. Cl.
  *G06T 11/20* (2006.01)
  *G06T 11/00* (2006.01)
  *G06F 3/048* (2013.01)

(52) U.S. Cl.
  CPC ............. *G06T 11/206* (2013.01); *G06F 3/048* (2013.01); *G06T 11/001* (2013.01)

(58) Field of Classification Search
  CPC .................................................. G06T 11/206
  USPC ...................................................... 345/440.2
  See application file for complete search history.

(56) References Cited

U.S. PATENT DOCUMENTS

| | | | |
|---|---|---|---|
| 7,149,975 B1 * | 12/2006 | Johnson et al. | 715/734 |
| 7,627,812 B2 * | 12/2009 | Chamberlain et al. | 715/217 |
| 7,770,100 B2 * | 8/2010 | Chamberlain et al. | 715/217 |
| 8,255,789 B2 | 8/2012 | Berger et al. | |
| 8,266,530 B2 | 9/2012 | Harnois et al. | |
| 2005/0089223 A1 * | 4/2005 | Krumm | 382/170 |
| 2006/0002608 A1 * | 1/2006 | Haddon et al. | 382/173 |
| 2007/0204212 A1 * | 8/2007 | Chamberlain et al. | 715/503 |
| 2008/0082908 A1 * | 4/2008 | MacGregor | 715/215 |
| 2008/0098309 A1 | 4/2008 | Fries et al. | |
| 2008/0148140 A1 * | 6/2008 | Nakano | 715/215 |
| 2011/0154136 A1 | 6/2011 | Osuki | |
| 2012/0151352 A1 | 6/2012 | S. et al. | |
| 2013/0085901 A1 * | 4/2013 | Henderson et al. | 705/28 |

* cited by examiner

Primary Examiner — Javid A Amini
(74) Attorney, Agent, or Firm — Cantor Colburn LLP; William A. Kinnaman, Jr.

(57) ABSTRACT

A technique is provided for a graphical user interface on a computer. The technique includes receiving messages individually corresponding to resources being monitored, displaying rows in a table, and generating bar graphs of the messages respectively corresponding to the resources in the rows. Each of the bar graphs displays a color coded scheme to visually distinguish severity of the messages in each of the rows for the resources. The bar graphs display the severity of the messages for one resource per the given row without requiring user intervention to view severities of the messages displayed by the color coded scheme, without requiring user intervention to view a total number of messages for the given row, while maintaining a same row height regardless of the total number of messages for the given row, and without changing a table size including a table height and a table width of the table.

18 Claims, 8 Drawing Sheets

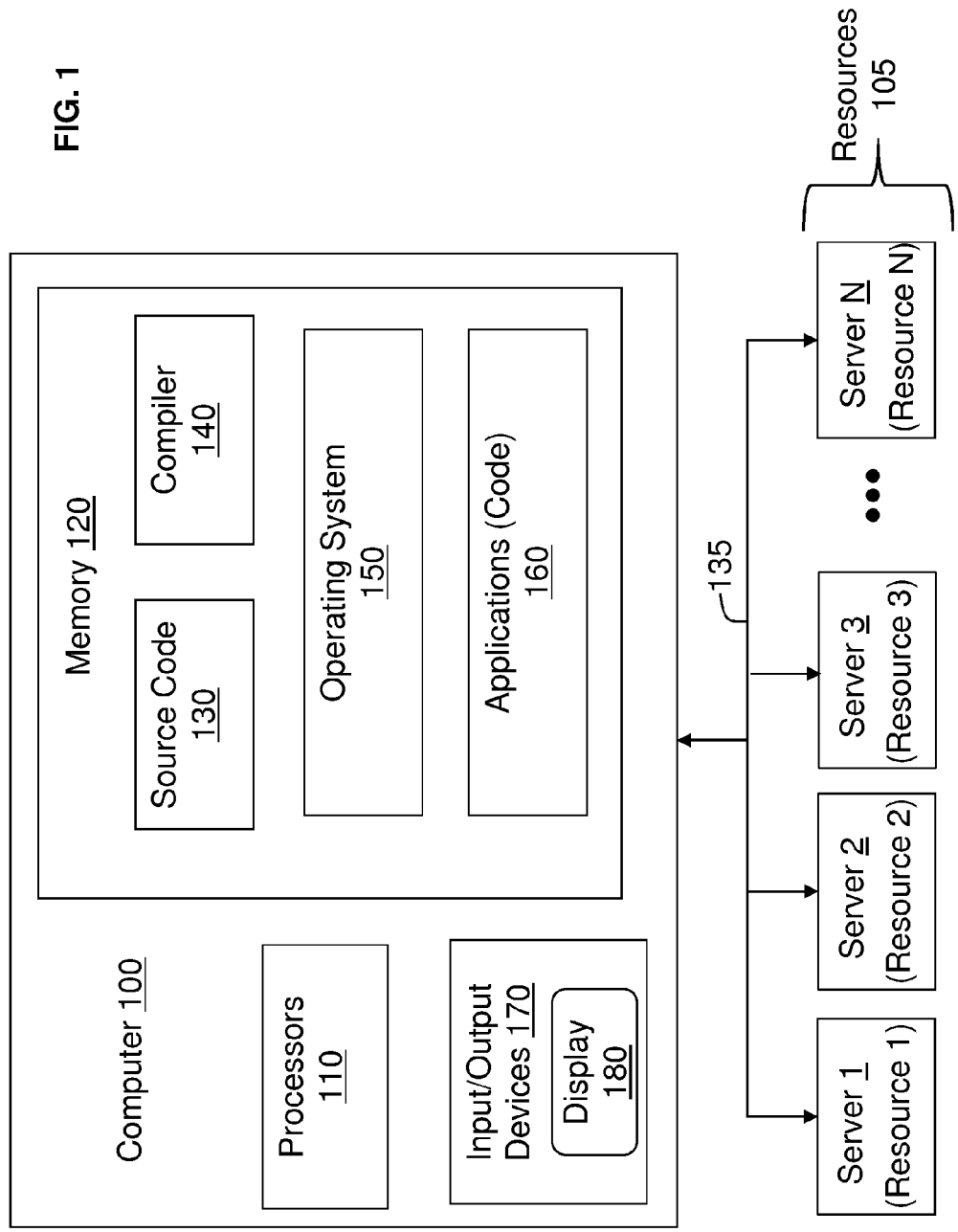

| | Actions ▽ | | 220 { | 205 { | 208 → | 210 → | 212 → | 214 → |
|---|---|---|---|---|---|---|---|---|
| | Data Set Name | Messages | | Zone Names | Volume | Data Set Type | RECFM | LRECL |
| 1 | AOP.SAOPEXEC | ▨ | | TZONE1, TZONE2 | ZW113 | PDS | FB | 80 |
| 2 | AOP.SAOPMENU | ▨ | 2 | TZONE1 | ZW113 | PDS | FB | 80 |
| 3 | AOP.SAOPMJPN | ▨ | 1 | TZONE1 | ZW113 | PDS | FB | 80 |
| 4 | AOP.SAOPPENU | ▨ | 1 | TZONE1 | ZW113 | PDS | FB | 80 |
| 5 | AOP.SAOPPJPN | ▨ | 1 | TZONE1 | ZW113 | PDS | FB | 80 |
| 6 | ASM.SASMMAC1 | ▨ | 4 | TZONE1 | | | | |
| 7 | ASM.SASMMAC2 | ▨ | | | | | | 80 |
| 8 | ASM.SASMMOD1 | ⋮ | | | | | | 0 |
| 9 | ASM.SASMMOD2 | ⋮ | | | | | | 0 |
| 10 | ASM.SASMPUT2 | | | | | | | 80 |
| 11 | ASM.SASMSAM1 | | | | | | | 80 |
| 12 | ASM.SASMSAM2 | | | | | | | 80 |

⊗ Error Messages: 2

⊗ IZUD580E  ✕
  The data set "ASM.SASMMAC1" is corrupted.

⊗ IZUD590E  ✕
  This is a Error Message.

FIG. 2

| Actions ▽ | | 205 | | | | | |
|---|---|---|---|---|---|---|---|
| Data Set Name | Messages | | Zone Names | Volume | Data Set Type | RECFM | LRECL |
| 1 | AOP.SAOPEXEC | ▨ | 1 | TZONE1, TZONE2 | ZW113 | PDS | FB | 80 |
| 2 | AOP.SAOPMENU | ▨ | 2 | TZONE1 | ZW113 | PDS | FB | 80 |
| 3 | AOP.SAOPMJPN | ▨ | 1 | TZONE1 | ZW113 | PDS | FB | 80 |
| 4 | AOP.SAOPPENU | ▨ | 1 | TZONE1 | ZW113 | PDS | FB | 80 |
| 5 | AOP.SAOPPJPN | ▨ | 1 | TZONE1 | ZW113 | PDS | FB | 80 |
| 6 | ASM.SASMMAC1 | ▨ | 4 | TZONE1 | ZW113 | PDS | FB | 80 |
| 7 | ASM.SASMMAC2 | ▦ | 1 | | | PDS | U | 0 |
| 8 | ASM.SASMMOD1 | ▦ | 1 | | | PDS | U | 0 |
| 9 | ASM.SASMMOD2 | ▦ | 1 | | ZW113 | PDS | FB | 80 |
| 10 | ASM.SASMPUT2 | | | | | | | |
| 11 | ASM.SASMSAM1 | | | TZONE1 | ZW113 | PDS | FB | 80 |
| 12 | ASM.SASMSAM2 | | | | | | FB | 80 |

⊗ Error Messages: 2
△ Warning Messages: 1
☐ Information Messages: 1

FIG. 5

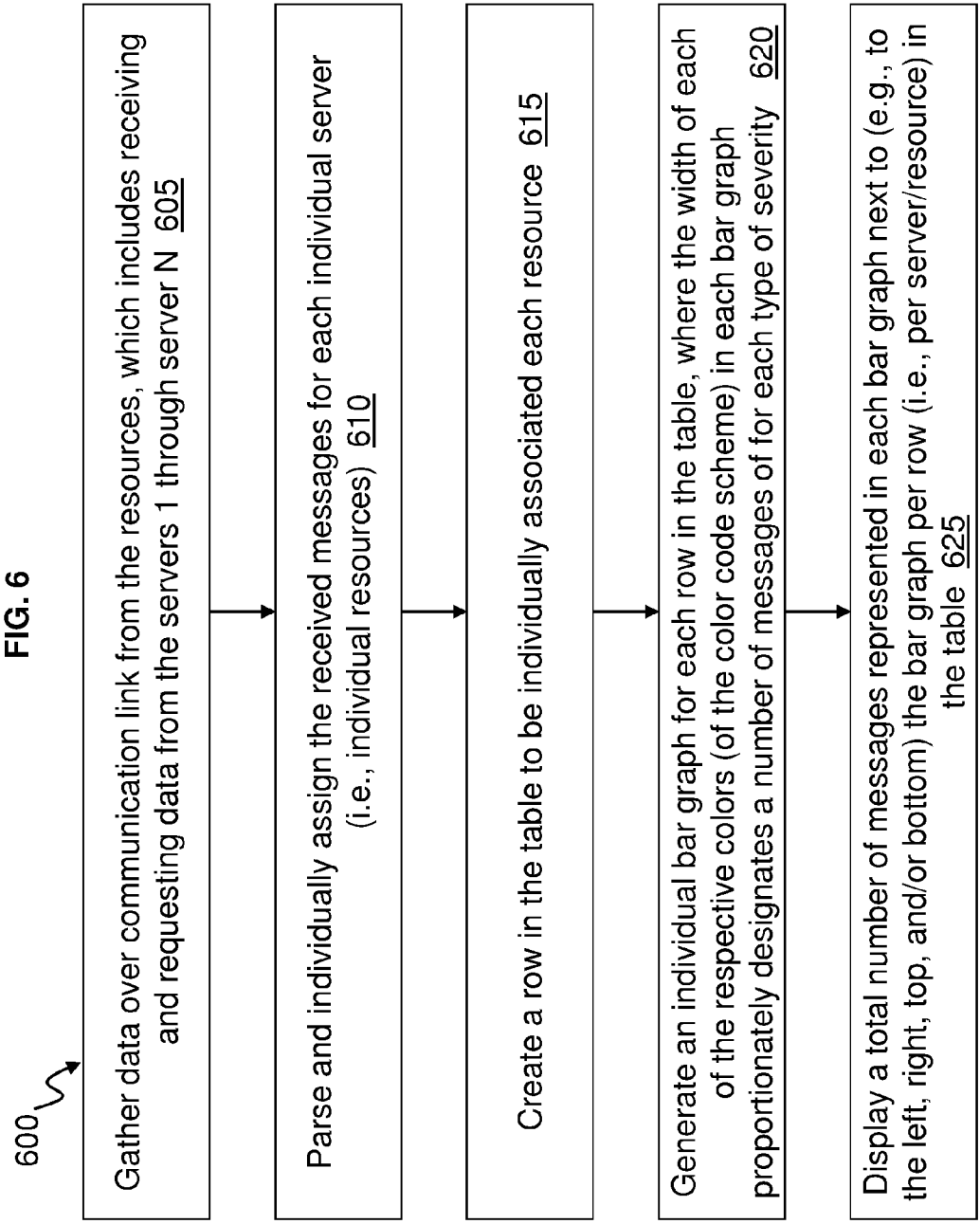

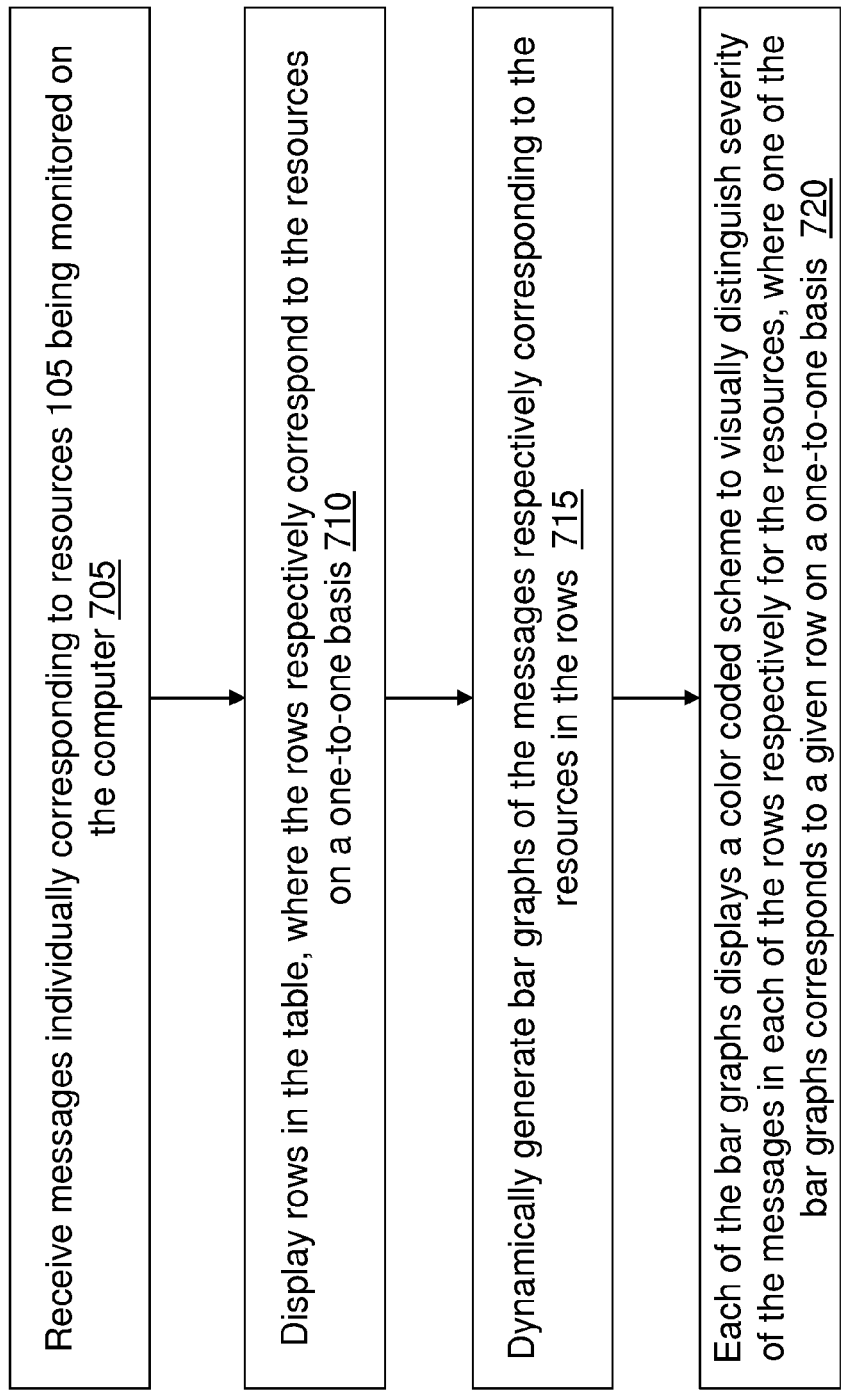

Respectively display the bar graphs in each row of the rows 725

Bar graphs display the severity of the messages for one resource per row without requiring user intervention to view the severities of the messages displayed by the color coded scheme, without requiring user intervention to view a total number of messages for the given row, while maintaining a same row height regardless of the total number of messages for the given row, and without changing a table size including a table height and a table width of the table. 730

GRAPHICAL USER INTERFACE FOR EFFICIENTLY VISUALIZING MULTIPLE MESSAGES OF DIFFERENT SEVERITIES IN A TABULAR FORMAT

BACKGROUND

The present invention relates generally to graphical user interfaces (GUIs), and more specifically, to a tabular format for efficiently visualizing multiple messages of different severities per row.

In computing, a graphical user interface (GUI, sometimes pronounced 'gooey') is a type of user interface that allows users to interact with electronic devices using images rather than text commands. GUIs can be used in computers, handheld devices (such as MP3 players, portable media players, or gaming devices), household appliances, office equipment, and industry equipment. A GUI represents the information and actions available to a user through graphical icons and visual indicators such as secondary notation, as opposed to text-based interfaces, typed command labels, or text navigation. The actions are usually performed through direct manipulation of the graphical elements.

SUMMARY

According to one embodiment, a method for providing a graphical user interface on a computer is provided. The method includes receiving messages individually corresponding to resources being monitored on the computer, displaying rows in a table, where the rows respectively correspond to the resources on a one-to-one basis, and dynamically generating bar graphs of the messages respectively corresponding to the resources in the rows. Each of the bar graphs displays a color coded scheme to visually distinguish severity of the messages in each of the rows respectively for the resources. One of the bar graphs corresponds to a given row on a one-to-one basis. The bar graphs are respectively displayed in each row of the rows. The bar graphs display the severity of the messages for one resource per the given row without requiring user intervention to view severities of the messages displayed by the color coded scheme, without requiring user intervention to view a total number of messages for the given row, while maintaining a same row height regardless of the total number of messages for the given row, and without changing a table size including a table height and a table width of the table.

According to one embodiment, a computer program product for providing a graphical user interface is provided. The computer program product includes a computer readable storage medium having program code embodied therewith. The program code is executable by the computer to perform operations which include receiving messages individually corresponding to resources being monitored on the computer, displaying rows in a table where the rows respectively correspond to the resources on a one-to-one basis, and dynamically generating bar graphs of the messages respectively corresponding to the resources in the rows. Each of the bar graphs displays a color coded scheme to visually distinguish severity of the messages in each of the rows respectively for the resources. One of the bar graphs corresponds to a given row on a one-to-one basis. The bar graphs are respectively displayed in each row of the rows. The bar graphs display the severity of the messages for one resource per the given row without requiring user intervention to view severities of the messages displayed by the color coded scheme, without requiring user intervention to view a total number of messages for the given row, while maintaining a same row height regardless of the total number of messages for the given row, and without changing a table size including a table height and a table width of the table.

Additional features and advantages are realized through the techniques of the present invention. Other embodiments and aspects of the invention are described in detail herein and are considered a part of the claimed invention. For a better understanding of the invention with the advantages and the features, refer to the description and to the drawings.

BRIEF DESCRIPTION OF THE SEVERAL VIEWS OF THE DRAWINGS

The subject matter which is regarded as the invention is particularly pointed out and distinctly claimed in the claims at the conclusion of the specification. The forgoing and other features, and advantages of the invention are apparent from the following detailed description taken in conjunction with the accompanying drawings in which:

FIG. 1 illustrates a system for monitoring resources and displaying the monitored resources in a graphical user interface according to an embodiment.

FIG. 2 illustrates an example implementation of the displayed graphical user interface according to an embodiment.

FIG. 5 illustrates features of the graphical user interface according to an embodiment.

FIG. 6 illustrates a process as an example scenario of monitoring the resources to generate the graphical user interface according to an embodiment.

FIGS. 7A and 7B illustrate a method for providing a graphical user interface on the computer according to an embodiment.

DETAILED DESCRIPTION

Figure 3:
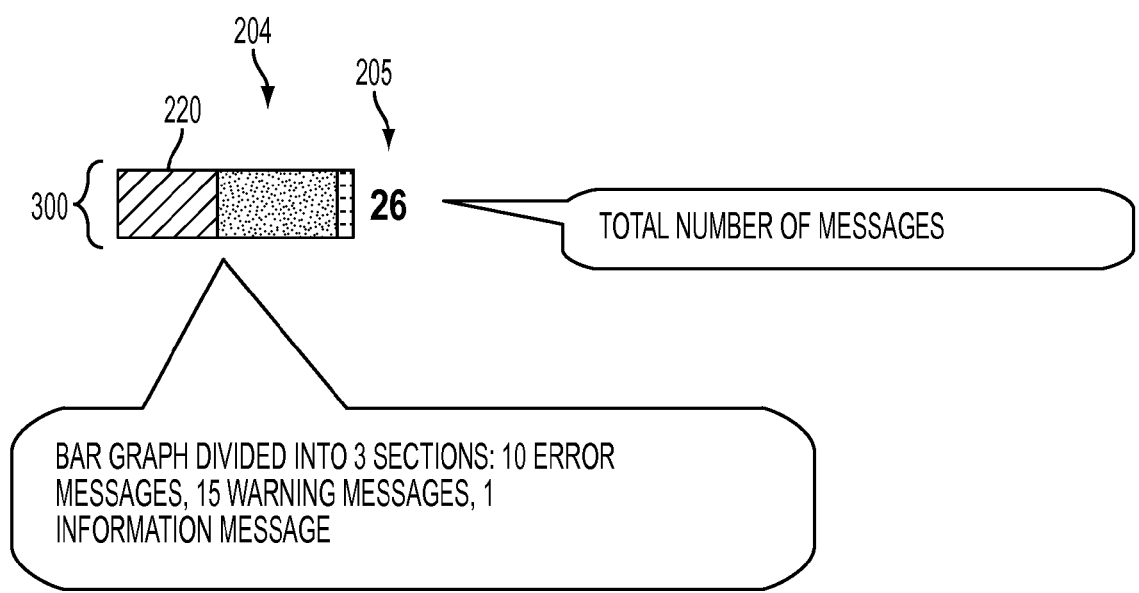
FIG. 3 illustrates details of an example row generated and displayed according to an embodiment.

Tables may be used in graphical user interfaces for displaying large lists of managed resources or events (such as systems, projects, etc.). There may be a case where each of these resources, in turn, contains multiple messages of varying severity associated with them, such as informational, warning, and error messages. It is desirable to present this information in a manner that can be easily and quickly consumed by a user who is monitoring the managed resources (including from a mobile device with a smaller display screen size).

Possible solutions to this problem usually may fall into one of the following two categories:

1) Display all the messages associated with each managed resource. Messages are typically displayed within the table via a messages column or as a listing of messages above the table. This solution has the following drawbacks. If the information is displayed within the table, the contents of the table can become distorted (the height and/or width of the row and/or table increases) when there are too many rows containing multiple messages. As the number of messages increases, the table quickly starts to look busy (i.e., rows increase in height to accommodate the various messages) because of information overload. When a resource has many messages, it is difficult to quickly discern the overall status of the resource. Space consumption and layout do not provide a good solution for mobile devices.

2) Display only a select set of messages, which is usually the last or highest severity for each event. The major drawback to this solution is that the user is only given limited information, and must typically investigate further, usually requiring multiple clicks and navigating to secondary windows to retrieve potentially important messages.

Solutions mentioned above are particularly problematic in mobile environments where scrolling and navigating to secondary windows can be cumbersome and time consuming.

Now turning to the figures, FIG. 1 illustrates a system 10 for monitoring resources and displaying the monitored resources in a graphical user interface according to an embodiment. The system 10 includes an example of a computer 100 which may implement, control, and/or create a graphical user interface via software application 160 according to an embodiment. The computer 100 may be representative of a mobile device such as a cellular phone (i.e., smart phone), a tablet, laptop, etc.

The computer 100 includes memory 120, and the memory 120 may include source code 130, a compiler 140, an operating system 150, and one or more software applications 160. The computer 120 also includes one or more processors 110 and input/output devices 170 (such as a keyboard, speakers, display 180 (including touch screen), pointing devices (i.e., mouse). The input/output devices 170 also include hardware and software for communicating (transmitting and receiving) data over wireline and wireless networks such as communication links 135. Additional details of the computer 100 are discussed further below.

The computer 100 may be operatively connected to one or more resources 105. In one case, the resources 105 may be individually monitored servers that are being monitored such as servers 1, 2, 3 through N, where server N represents the last server being monitored. Also, the resources 105 may be monitored individual virtual machines, monitored networks, and/or monitored processes running on the computer 100 itself. As understood by one skilled in the art, the resources 105 may represent any monitored resource 1 through resource N, where N is the last resource (such as resource 1000).

The software application 160 is configured to monitor each individual resource 105 and generate a table (such as example table 200 shown in FIG. 2) in which each row in the table is dedicated to (and displays the information for) one respective resource 105. Each resource 105 may have one or more messages (and in some cases no messages) associated with that particular resource 105, and each individual resources is contained in (constrained to) a single row in the table. The height of each of the rows remains the same regardless of the number of messages in each respective row in the table, while still visually displaying the different severities of messages per row (e.g., in a bar graph) and visually displaying the total number of message per row.

According to embodiments, the software application 160 is configured to generate a GUI element that visually displays the severity of the messages for each row in a table. FIG. 2 illustrates an example implementation of the proposed graphical user interface (i.e., widget) in a table 200 generated and displayed via software application 160 according to an embodiment. The table 200 provides a representative example displayed in a tabular format on the display 180 (which may be the display of a mobile device).

The table 200 includes a name column 202, a messages column 204, a zone names column 206, a volume column 208, a data set type column 210, an RECFM column 212, and a LRECL column 214. Although some columns are specific to the computer systems running a z/OS® operating system, these examples are not meant to be limiting. The columns represent attributes of the managed objects important to the system administrator (i.e., the consumer of the information). The zone names column 206 indicates the zone for the resource 105, and the volume column 208 indicates the particular volume for the resource 105. In the RECFM column 212, the RECFM parameter specifies the format and characteristics of the records in a new data set. In the LRECL column 214, the LRECL parameter specifies the length of the records in a new data set.

Each individual resource 105 is designated in and associated with its own row in the table 200. Accordingly, resource 1 is designated in row 1, resource 2 is designated in row 2, resource 3 is designated in resource 3, and so forth. In this example, the table 200 shows rows 1 through 12 directly corresponding to resources 1 through 12. The resources 105 may be the servers 1, 2, 3 through N (where N=12), and the software application 160 is configured to respectively display information for each server (resource) in its own single row. The software application 160 in computer 100 receives the input (i.e., data) from each server 1, 2, 3 through N (i.e., each respective resource 105) over the communication link 135. Accordingly, the software application 160 is configured to dynamically generate the table 200 from the input from each respective server (i.e., resource) such that as additional status information is respectively received from each of the servers 1 through N, the respective row is updated to reflect the updated status information for that particular server. Update information may include adding more messages to a total number of message column for a given row, and/or increasing the width of particular color code in the bar graph.

The message column 204 shows bar type graphical representations 220 (e.g., bar graphs) of the messages for each row, and the bar type graphical representations 220 are color coded by severity. The color coding of the bar type graphical representation 220 is configured to visually display each different severity (at a glance) as a corresponding segment of the bar type representation 220 per row (i.e., per resource 105). This allows the viewer to easily and quickly recognize each different severity (per row) without having click on each individual message for a particular resource, based on the size (i.e., width) of the segment denoting the particular type of severity.

For each row (i.e., each individual resource 105), the software application 160 is configured to display the total number of messages across all severities shown in the bar type graphical representation 220 (of the messages for that particular resource 105) to the given row. The table 200 has a total number of messages column 205 which respectively displays the total number of message in each row beside the respective bar type graphical representation 220. For example, row 6 corresponding to resource 6 (such as, e.g., server 6) shows bar type representation 220 with 4 messages across all of the severities.

The software application 160 is configured to provide the user with the ability to hover over any section/segment of the bar graph 220 to visually display all messages of the corresponding severity type (shown by the color code, such as a first color code, a second color code, a third color code, etc.). The first color code, second color code, and third color code respectively denote high severity messages, medium severity messages, and low severity messages. It is understood that although severity type messages are discussed herein, other types of messages can be analogously applied as disclosed herein. The first color code denotes error messages (high severity), the second color code denotes warning messages (medium severity), and the third color code denotes informational messages (low severity). For example, again referring to row 6 (e.g., server 6), the user has placed the cursor 230 over the first color code of high severity (on the bar graph 220 in row 6) to visually display each of the high severity messages out of the total of 4 messages in row 6. By hovering (or clicking) the cursor 230 over the first color code segment of the bar graph 220 in row 6, an error message window 235 (i.e., flyover window) appears with 2 error messages corresponding to the first color code. The error message window 235 displays one error message named IZUD580E and another error message named IZUD590E. Similarly, when the user hovers the cursor 230 over the second color code segment of the bar graph 220 in row 6, a warning window appears with 1 warning message (analogous to window 235). When the user hovers the cursor 230 over the third color code segment in the bar graph 220 in row 6, an information window appears over the table 200 with 1 informational message (analogous to window 235). Each of these severity messages adds up to the total of 4 messages in row 6. The individual color code segments (e.g., first, second, and third colors) in the bar graph 220 has a width that visually displays and corresponds to the respective percentage of the total of 4 messages in row 6. As such, the software application 160 constructs the width of each color code segment (in the bar graph 220) to be in direct proportion to the amount of messages in that particular color code. For example, in row 6, the first color code segment is twice as wide as compared to the second and third color code segments because the first color code segment represents 2 messages while the second and third color code segments represent 1 message each.

Note that although example first, second, and third color codes are discussed as representations of different severities, these representations are for explanation purposes and are not meant to be limited.

Via the software application 160, the message visualization (per row, i.e., per resource 105) of the bar type graphical representations 220 in the table 200 includes the following characteristics: the table 200 provides a quick summary of the number of messages and their severity for each row in the table; table 200 does not become distorted, e.g., all rows are same height regardless of the number of messages per row; the table 200 avoids the requirement/need to change context to view/obtain information on the number of messages and their severity type per row; and the table 200 minimizes scrolling and is therefore ideal for user interfaces with limited screen space (such as, e.g., mobile devices like smart phones).

As discussed herein, the software application 160 generates the novel GUI element (i.e., widget) for displaying multiple message severity information within a tabular format and mobile environment. Although the software application 160 is shown as an example implementation, there may be other GUI implementation technologies capable of rendering such a widget. Such technologies would include, but are not limited to: web application widget libraries, such as Dojo (used for the above example) and JavaServer Faces (JSF); Java libraries, such as SWT and Swing; C++ GUI libraries; and numerous low-level implementation options for building the widget from scratch. The widget refers to the table 200 generated by the software application 160 along with the functionality discussed herein.

FIG. 3 illustrates details of an example row 300 (as would be displayed in the table 200) generated and displayed by the software application 160 according to an embodiment. The example row 300 represents any given row in the table 200. The example row 300 includes a bar type graphical representation 220 that is color coded by the severity of the messages for this given row. The number 26 (i.e., taken from the total number of messages column 205) to the right of the bar graph 220 is the total number of messages depicted in the bar graph 220. In FIG. 3, there are 10 error messages (represented by the first color code such as red), 15 warning messages (represented by the second color code such as yellow), and 1 informational message (represented by the third color code such as blue). As noted above, the width of each section in the bar graph 220 is proportional to the number of messages for each respective severity type. For illustration purposes, the first color code is depicted with diagonal lines, the second color code is depicted with dotted shading, and the third color code is depicted with horizontal lines.

Figure 4:
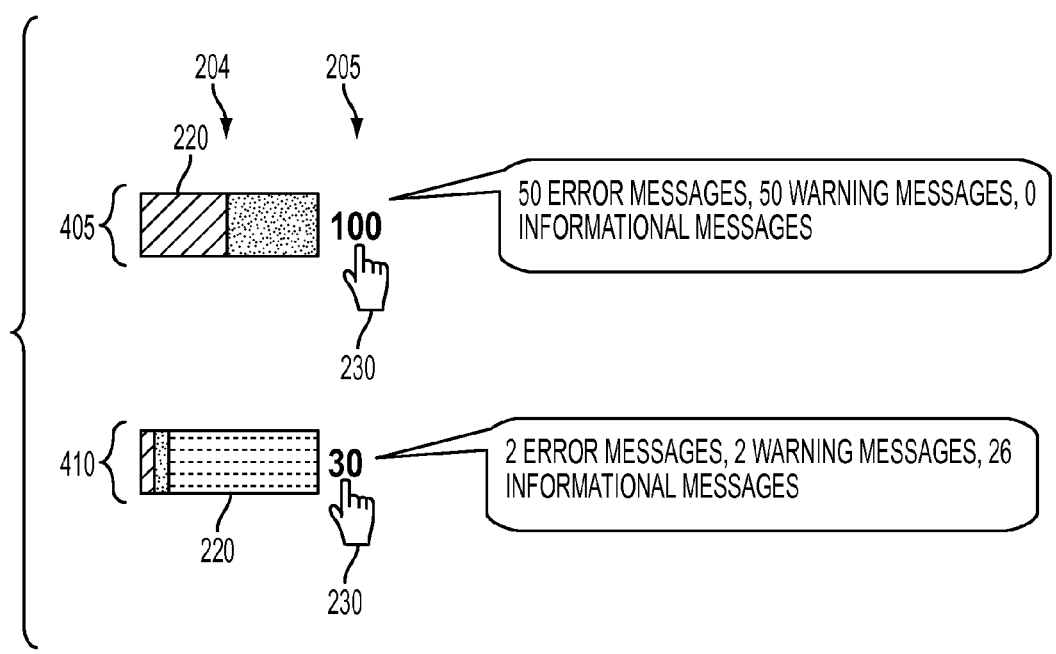
FIG. 4 illustrates examples of bar type graphical representations displayed for different message scenarios in the graphical user interface according to an embodiment.

FIG. 4 illustrates more examples of how the bar type graphical representations 220 may be visually displayed (via the software application 160) for different message scenarios (displayed in table 200) according to an embodiment. In FIG. 4, example row 405 (which may be any given row in the table 200) includes the bar graph 220 which represents a total of 100 messages for a given resource 105 (i.e., such as a particular server 10). The bar graph 220 in example row 405 only shows two colors, which are the first color code and the second color code. In this case, the first color code contains and/or proportionally represents 50 error messages and the second color code contains and/or proportionally represents 50 warning messages. Accordingly, the bar graph 220 is displayed with two segments of equal width to enable the user to quickly ascertain that there are half error messages and half warning messages for the example row 405.

In FIG. 4, example row 410 (which may be any given row in the table 200) shows the bar graph 220 which represents a total of 30 messages for a given resource 105 (i.e., such as a particular server 20). The bar graph 220 in example row 410 shows the first color code (high severity), the second color code (medium severity), and the third color code (low severity). In this case, the first color code contains and/or proportionally represents 2 error messages, the second color code contains and/or proportionally represents 2 warning messages, and the third color code contains and/or proportionally represents 26 informational messages. Accordingly, the bar graph 220 is displayed with two segments of equal width for the first and second color codes and is displayed with a large width for the third color code (proportionally corresponding to 26 informational messages) to enable the user to quickly ascertain that almost all of the 30 messages are simply informational messages.

FIG. 5 illustrates another feature of the graphical user interface (widget) in the table 200 via the software application 160 according to an embodiment. When the user hovers the cursor 230 over a specific region (such as the total number of message column 205) for a given row such as the row 6 (e.g., corresponding to server 6), the software application 160 is configured display in a summary window 505 (flyover window) all the messages (of each of the three color codes) of the corresponding severity types for the row 6. Since row 6 has a total of 4 messages, the software application 160 is configured to display in the summary window 505 summary of 2 error messages next to an error message icon, 1 warning message next to a warning message icon, and 1 information message next to an information error icon. The total messages identified in the summary window 505 add up to the total of 4 messages (shown in the total number of message column 205 for row 6).

There may be case where a given row has a bar graph 220 that only has the third color code displayed across the entire width of the bar graph 220. However, the total number of messages may be 1000. Based on the color of the bar graph being the third color code denoting only informational messages, the software application 160 allows the user to quickly recognize that this given row is of low priority even though 1000 informational messages are present.

The table 200 may be prioritized in terms of the color code and/or proportion of a particular color code comprising the bar graph 220. For example, the software application 160 is configured to allow the table 200 to have bar graphs 220 containing mostly (and/or only) the first color code (high severity messages such as error messages) at the top of the table 200, bar graphs 220 containing various proportions of all the color codes (but requiring high severity messages) would be next, bar graphs not containing the first color code (i.e., no error messages) but containing mostly and/or only the second color code (medium severity messages such as warning messages) would be next, and bar graphs 220 containing mostly (and/or only) the third color code (low severity messages such as informational messages) are listed at the bottom of the table 200. Accordingly, the software application 160 is configured to sort the table 200 in terms of the color code in the bar graphs 220, based on any desired color code.

FIG. 6 illustrates a process 600 as an example scenario of monitoring the resources 105 to generate the graphical user interface displayed as table 200 with the features discussed herein according to an embodiment. Reference can be made to FIGS. 1-5.

At block 605, the software application 160 of computer 100 is configured to gather data over communication link 135 from the resources 105, which includes receiving and requesting data from the servers 1 through server N. The data includes respective messages of each severity type (such as error messages, warning messages, and informational messages) from each server 1 through N along with identifying information of each server 1 through N.

The software application 160 is configured to parse and individually assign the received messages for each individual server 1 though N (i.e., individual resources 105) at block 610.

The software application 160 is configured to create a row in the table 200 to be individually associated each resource 105 until all resources 105 have its own exclusively assigned row at block 615.

The software application 160 is configured to generate an individual bar graph 220 for each row in the table 200, where the width of each of the respective colors (of the color code scheme) in each bar graph 220 proportionately designates a number of messages of for each type of severity present for the given resource 105 at block 620.

The software application 160 is configured to display a total number of messages represented in each bar graph 220 next to (e.g., to the left, right, top, and/or bottom of) the bar graph 220 per row (i.e., per server/resource 105) in the table 200 at block 625. The software application 160 configures the bar graph 220 (and the entire table 200) to be interactive such that selecting any particular color code (e.g., first, second, third, etc.) by highlighting, hovering over, being in proximity to, etc., displays the severity messages associated with that particular color code in a flyover window 235 (for that particular severity, such as the highest severity corresponding to error messages). In one case, each bar graph 220 in the messages column 204 may be configured as an interactive callout button, where each color code is a separate/individual button/tab that is designed to display messages (i.e., window 235) associated with the severity type of that color code when selected.

Similarly, in the total number of messages column 205, each total number of messages is configured per row as a separate/individual button/tab that is designed to display messages (i.e., summary window 505) associated with all severity types in the bar graph 220 for a particular resource 105 when selected. For example, when the user selects (highlights, hovers over, is in proximity to, etc.) the total number of messages button/tab (in the total number column 205) for a given row representing an individual server/resource 105, the software application 160 is configured to display a summary window 505 summarizing the number of messages for each severity type associated with each of the color codes in the bar graph 202.

Each time any new information is gathered for a particular resource 105, the software application 160 is configured to update the bar graph 220, update the total number of messages (in column 205) for the given resource in the given row, and update the data in windows 235 and 505.

FIGS. 7A and 7B illustrate a method 700 for providing a graphical user interface on the computer 100 according to an embodiment. Reference can be made to FIGS. 1-6.

The software application 160 is configured to receive messages individually corresponding to resources 105 being monitored on the computer 100 at block 705.

The software application 160 is configured to display rows in the table 200, where the rows respectively correspond to the resources 105 on a one-to-one basis at block 710.

The software application 160 is configured to dynamically generate bar graphs 220 of the messages respectively corresponding to the resources 105 in the rows at block 715.

The software application 160 application is configured where each of the bar graphs displays a color coded scheme to visually distinguish severity of the messages in each of the rows respectively for the resources, and where one of the bar graphs corresponds to a given row on a one-to-one basis at block 720. Note that although a color coded scheme is discussed for explanation purposes, it is understood that other coded schemes may be utilized in addition to the color coded scheme such as a shading coded scheme (e.g., 3 different shades respectively correspond to 3 different severities), a hatching coded scheme (e.g., 3 different types of hatching respectively correspond to 3 different severities), a design/pattern coded scheme (e.g., 3 different designs/patterns respectively correspond to 3 different severities), and/or a combination thereof. Furthermore, it is understood that the first code, the second code, third code, etc., can be represented in any coded scheme in the bar graphs 220 according to the embodiments disclosed herein.

The software application 160 is configured to respectively display the bar graphs in each row of the rows at block 725.

At block 730, the software application 160 is configured where the bar graphs display the severity of the messages for one resource per row without requiring user intervention to view the severities of the messages displayed by the color coded scheme, without requiring user intervention to view a total number of messages for the given row, while maintaining a same row height regardless of the total number of messages for the given row, and without changing a table size including a table height and a table width of the table.

Also, the software application 160 is configured to distinguish the severity of the messages for the given row by providing a first color in the bar graphs in which the first color visually designates a high severity, provide a second color in the bar graphs in which the second color visually designates a medium severity, and provide a third color in the bar graphs in which the third color visually designates a low severity. Additional and fewer colors may be utilized to denote each type of severity of the messages.

The total number of messages for the given row is a summation of the messages having the first color, the second color, and the third color visually displayed in the bar graph for the given row. For the given row, the software application 160 visually displays a width of each color in the one bar graph to be visually proportional to a corresponding category of the severity of the messages.

In response to a cursor over a first color in the color code scheme, the software application 160 displays the messages associated with a high severity for the first color in the one bar graph. In response to the cursor over a second color in the color code scheme, the software application 160 displays the messages associated with a medium severity for the second color in the one bar graph.

In response to a cursor over the total number of messages for the given row, the software application 160 displays a summary for each of the severities corresponding to the messages associated with the given row. The summary comprising first number of messages for a first color, a second number of messages for a second color, and a third number of messages for a third color in the one bar graph of the given TOW.

The resources 105 being individually monitored comprise at least one of servers, routers, virtual machines, running processes, and/or network bandwidth. Also, the rows in the table 200 are prioritized by colors in the color coded scheme, such that one particular color code (and/or majority color) of the bar graphs 220 is first in the table 200, another color code is next, and so forth.

Referring to back FIG. 1, various methods, procedures, modules, flow diagrams, tools, applications, circuits, elements, and techniques discussed herein may also incorporate and/or utilize the capabilities of the computer 100. Moreover, capabilities of the computer 100 may be utilized to implement features of exemplary embodiments discussed herein. The hardware and software elements of the computer 100 may be representative of hardware and software utilized in any of the resources 105 as understood by one skilled in the art. One or more of the capabilities of the computer 100 may be utilized to implement, to connect to, and/or to support any element discussed herein (as understood by one skilled in the art) in FIGS. 1-7.

Generally, in terms of hardware architecture, the computer 100 may include one or more processors 110, computer readable storage memory 120, and one or more input and/or output (I/O) devices 170 that are communicatively coupled via a local interface (not shown). The local interface can be, for example but not limited to, one or more buses or other wired or wireless connections, as is known in the art. The local interface may have additional elements, such as controllers, buffers (caches), drivers, repeaters, and receivers, to enable communications. Further, the local interface may include address, control, and/or data connections to enable appropriate communications among the aforementioned components.

The input/output device 170 (having proper software and hardware) of computer 100 may include and/or be coupled to a communication interface which comprises hardware and software for operatively connecting to and communicating with the resources 105. The user interfaces of the input/output device 170 may include, e.g., a track ball, mouse, pointing device, keyboard, touch screen, etc., for interacting with the computer 100, such as inputting information, making selections, controlling the cursor, etc.

The processor 110 is a hardware device for executing software that can be stored in the memory 120. The processor 110 can be virtually any custom made or commercially available processor, a central processing unit (CPU), a data signal processor (DSP), or an auxiliary processor among several processors associated with the computer 100, and the processor 110 may be a semiconductor based microprocessor (in the form of a microchip) or a macroprocessor.

The computer readable memory 120 can include any one or combination of volatile memory elements (e.g., random access memory (RAM), such as dynamic random access memory (DRAM), static random access memory (SRAM), etc.) and nonvolatile memory elements (e.g., ROM, erasable programmable read only memory (EPROM), electronically erasable programmable read only memory (EEPROM), programmable read only memory (PROM), tape, compact disc read only memory (CD-ROM), disk, diskette, cartridge, cassette or the like, etc.). Moreover, the memory 120 may incorporate electronic, magnetic, optical, and/or other types of storage media. Note that the memory 120 can have a distributed architecture, where various components are situated remote from one another, but can be accessed by the processor 110.

The software in the computer readable memory 120 may include one or more separate programs, each of which comprises an ordered listing of executable instructions for implementing logical functions. The software in the memory 120 includes a suitable operating system (O/S) 150, compiler 140, source code 130, and one or more applications 160 of the exemplary embodiments. As illustrated, the application 160 comprises numerous functional components for implementing the features, processes, methods, functions, and operations of the exemplary embodiments.

The operating system 150 may control the execution of other computer programs, and provides scheduling, input-output control, file and data management, memory management, and communication control and related services.

The application 160 may be a source program, executable program (object code), script, or any other entity comprising a set of instructions to be performed. When a source program, then the program is usually translated via a compiler (such as the compiler 140), assembler, interpreter, or the like, which may or may not be included within the memory 120, so as to operate properly in connection with the O/S 150. Furthermore, the application 160 can be written as (a) an object oriented programming language, which has classes of data and methods, or (b) a procedure programming language, which has routines, subroutines, and/or functions.

The I/O devices 170 may include input devices (or peripherals) such as, for example but not limited to, a mouse, keyboard, scanner, microphone, camera, etc. Furthermore, the I/O devices 170 may also include output devices (or peripherals), for example but not limited to, a printer, display 180, etc. Finally, the I/O devices 170 may further include devices that communicate both inputs and outputs, for instance but not limited to, a NIC or modulator/demodulator (for accessing remote devices, other files, devices, systems, or a network), a radio frequency (RF) or other transceiver, a telephonic interface, a bridge, a router, etc. The I/O devices 170 also include components for communicating over various networks, such as the Internet or an intranet. The I/O devices 170 may be connected to and/or communicate with the processor 110 utilizing Bluetooth connections and cables (via, e.g., Universal Serial Bus (USB) ports, serial ports, parallel ports, FireWire, HDMI (High-Definition Multimedia Interface), etc.).

In exemplary embodiments, where the application 160 is implemented in hardware, the application 160 can be implemented with any one or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated The flow diagrams depicted herein are just one example. There may be many variations to this diagram or the steps (or operations) described therein without departing from the spirit of the invention. For instance, the steps may be performed in a differing order or steps may be added, deleted or modified. All of these variations are considered a part of the claimed invention.

While the preferred embodiment to the invention had been described, it will be understood that those skilled in the art, both now and in the future, may make various improvements and enhancements which fall within the scope of the claims which follow. These claims should be construed to maintain the proper protection for the invention first described.

What is claimed is:

1. A method for providing a graphical user interface on a computer, the method comprising:
   receiving, by a computer, messages individually corresponding to resources being monitored on the computer;
   displaying, by the computer, rows in a table, the rows respectively corresponding to the resources on a one-to-one basis;
   dynamically, by the computer, generating bar graphs of the messages respectively corresponding to the resources in the rows;
   wherein each of the bar graphs displays a coded scheme to visually distinguish severity of the messages in each of the rows respectively for the resources;
   wherein each of the bar graphs corresponds to a given row on a one-to-one basis; and
   respectively displaying the bar graphs in each of the rows;
   wherein the bar graphs display the severity of the messages for one resource per the given row without requiring user intervention to view severities of the messages displayed by the coded scheme, without requiring user intervention to view a total number of messages for the given row, and while maintaining a same row height regardless of the total number of messages for the given row;
   for one bar graph of the bar graphs in one row of the rows, displaying, by the computer, the one bar graph in the one row comprising a first color designating high severity messages, a second color designating medium severity messages, and a third color designating low severity messages, wherein, for the one bar graph in the one row, a first length of the first color is proportional to a number of the high severity messages, a second length of the second color is proportional to a number of the medium severity messages, and a third length of the third color is proportional to a number of the low severity messages.

2. The method of claim 1, further comprising distinguishing the severity of the messages for the given row by providing the first color in the bar graphs in which the first color visually designates the high severity messages, providing the second color in the bar graphs in which the second color visually designates the medium severity messages, and providing the third color in the bar graphs in which the third color visually designates the low severity messages.

3. The method of claim 2, wherein the total number of messages for the given row is a summation of the messages having the first color, the second color, and the third color visually displayed in a corresponding bar graph for the given row.

4. The method of claim 1, wherein the bar graphs further display the severity of the messages for one resource per the given row without changing a table size including a table height and a table width of the table.

5. The method of claim 1, further comprising for the given row, visually displaying a width of each color in a corresponding bar graph to be visually proportional to a corresponding category of the severity of the messages.

6. The method of claim 1, further comprising in response to a cursor over a given color in the code scheme, displaying messages associated with a corresponding category of severity for the given color in a corresponding bar graph.

7. The method of claim 1, further comprising in response a cursor over the total number of messages for the given row, displaying a summary for each of the severities corresponding to the messages associated with the given row.

8. The method of claim 7, wherein the summary comprises a first number of messages for a first color, a second number of messages for a second color, and a third number of messages for a third color in a corresponding bar graph of the given row.

9. The method of claim 1, wherein the resources being individually monitored comprise at least one of: servers, routers, virtual machines, running processes, and network bandwidth; and
   wherein the rows in the table are prioritized by colors in the coded scheme.

10. A computer program product for providing a graphical user interface, the computer program product comprising a non-transitory computer readable storage medium having program code embodied therewith, the program code executable by the computer to perform operations comprising:
    receiving messages individually corresponding to resources being monitored on the computer;
    displaying rows in a table, the rows respectively corresponding to the resources on a one-to-one basis;
    dynamically generating bar graphs of the messages respectively corresponding to the resources in the rows;
    wherein each of the bar graphs displays a coded scheme to visually distinguish severity of the messages in each of the rows respectively for the resources;
    wherein each of the bar graphs corresponds to a given row on a one-to-one basis; and
    respectively displaying the bar graphs in each of the rows;
    wherein the bar graphs display the severity of the messages for one resource per the given row without requiring user intervention to view severities of the messages displayed by the coded scheme, without requiring user intervention to view a total number of messages for the given row, and while maintaining a same row height regardless of the total number of messages for the given row;
    for one bar graph of the bar graphs in one row of the rows, displaying, by the computer, the one bar graph in the one row comprising a first color designating high severity messages, a second color designating medium severity messages, and a third color designating low severity messages, wherein, for the one bar graph in the one row, a first length of the first color is proportional to a number of the high severity messages, a second length of the second color is proportional to a number of the medium severity messages, and a third length of the third color is proportional to a number of the low severity messages.

11. The computer program product of claim 10, further comprising distinguishing the severity of the messages for the given row by providing the first color in the bar graphs in which the first color visually designates the high severity messages, providing the second color in the bar graphs in which the second color visually designates the medium severity messages, and providing the third color in the bar graphs in which the third color visually designates the low severity messages.

12. The computer program product of claim 11, wherein the total number of messages for the given row is a summation of the messages having the first color, the second color, and the third color visually displayed in a corresponding bar graph for the given row.

13. The computer program product of claim 10, further comprising for the given row, visually displaying a width of each color in a corresponding bar graph to be visually proportional to a corresponding category of the severity of the messages.

14. The computer program product of claim 10, wherein the bar graphs further display the severity of the messages for one resource per the given row without changing a table size including a table height and a table width of the table.

15. The computer program product of claim 10, further comprising in response to a cursor over a given color in the code scheme, displaying messages associated with a corresponding category of severity for the given color in a corresponding bar graph.

16. The computer program product of claim 10, further comprising in response a cursor over the total number of messages for the given row, displaying a summary for each of the severities corresponding to the messages associated with the given row.

17. The computer program product of claim 16, wherein the summary comprises a first number of messages for a first color, a second number of messages for a second color, and a third number of messages for a third color in a corresponding bar graph of the given row.

18. The computer program product of claim 10, wherein the resources being individually monitored comprise at least one of: servers, routers, virtual machines, running processes, and network bandwidth.

* * * * *